INVENTORS
ADRIAAN RADEMAKERS
HUGO GEORG BRUYNING

BY

AGENT

United States Patent Office 2,774,935
Patented Dec. 18, 1956

2,774,935

INDUCTANCE ASSEMBLY SUCH AS A TRANS-
FORMER FOR THE TRANSMISSION OF
PULSES

Adriaan Rademakers and Hugo Georg Bruyning, Eindhoven, Netherlands, assignors to Hartford National Bank and Trust Company, Hartford, Conn., as trustee Application May 29, 1953, Serial No. 358,312

Claims priority, application Netherlands June 3, 1952

4 Claims. (Cl. 323—56)

The invention relates to an inductance assembly such as a transformer for the transmission of pulses. More particularly, the invention relates to an inductance assembly having a ferro-magnetic core of high magnetic permeability and provided with an air-gap in which a permanent magnet magnetized in a direction parallel to its smallest dimension for inducing a premagnetizing field in the core is disposed.

The principal object of the invention is the provision of a device of the aforesaid type in which the permanent magnet produces substantially the same flux in the core when an externally applied magnetic field is withdrawn from the core irrespective of the magnitude of that externally applied field.

In a prior copending U. S. application, Ser. No. 264,979, filed January 4, 1952, now abandoned, and an application, Serial No. 445,068, filed July 22, 1954, a continuation-in-part of said application Serial No. 264,979, a permanent magnet of electrically non-conductive material having a vanishing field strength $_I$H$_c$ substantially greater than the coercive field strength $_B$H$_c$ (the coercive field strength at which the retentivity B$_r$ becomes zero as distinguished from $_I$H$_c$, the field strength at which the intensity of magnetization, I, becomes zero) is provided in the air-gap of a core for a transformer adapted to transmit pulses. In the device disclosed in that application, the permanent magnet occupies the entire volume of air-gap in the closed magnetic circuit. If the permanent magnet is proportioned such that it exactly saturates the ferromagnetic material in one direction at zero value of the current producing the external field, i. e., with no pulses traversing the primary winding of the transformer disclosed therein, the vanishing field strength $_I$H$_c$ of the permanent magnet would have to be at least twice the coercive field strength $_B$H$_c$ so that saturation of the ferromagnetic material in the opposite direction when the pulses are applied to the primary winding should limit to the required value the demagnetizing field produced by the current, i. e., prevent demagnetization of the magnet. This requirement is not fulfilled by the ferromagnetic materials hitherto known, as far as $_I$H$_c$ and $_B$H$_c$ are measured after the material has been subjected to a high polarizing field, but partial demagnetization may readily produce effective values of $_I$H$_c$ and $_B$H$_c$ at which the foregoing requirement is fulfilled and the magnet stabilized.

However, owing to this partial demagnetization, the BH$_{max}$. value of the permanent magnetic material is reduced so that the volume of the material required to produce the same field strength in the ferromagnetic circuit must be larger.

According to the invention, a permanent magnet which completes the magnetic circuit of a transformer core having an air-gap is disposed in this air-gap but has a volume substantially smaller than that required to fill the air-gap and is operated on a more favorable portion of its reversible magnetization curve.

The invention will now be described with reference to the accompanying drawing in which.

Figure 1:
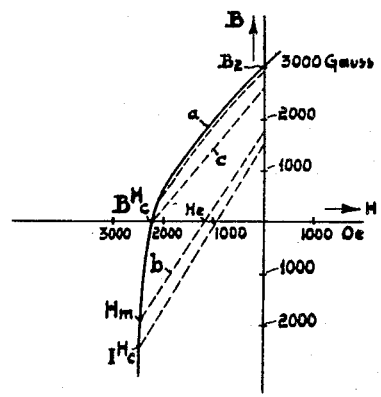
Fig. 1 is a graphical representation of several magnetization curves of a permanent magnet material suitable for use in the present device.

In Fig. 1, the full line indicates the relationship between the magnetic induction B and the magnetic field strength H of a permanent magnet material of a substantially non-conductive kind, particularly, an anisotropic permanent magnet material consisting essentially of a composite oxide of iron and one or more of the metals Ba, Sr, and Pb and Ca as a replacement for the latter metals in amount up to 0.4 atomic percent. This material, which is polarized in advance by a strong polarizing field of several thousands of Oersted, is described in a copending United States application, Serial No. 325,202, filed December 10, 1952. If the field H inside the material is made equal to zero, the induction B prevailing inside the material is termed the remanent induction B$_r$; at the so-called coercive field strength $_B$H$_c$, the induction B is exactly equal to zero; at the vanishing field strength $_I$H$_c$, the magnetization $$I = \frac{B-H}{4\pi}$$

inside the material is equal to zero. Such materials have a low ratio between B$_r$:$_B$H$_c$, usually of less than 4, if B$_r$ is expressed in Gauss and $_B$H$_c$ in Oersted.

However, if the field strength in such a material strongly polarized in advance is rendered first negative to a certain extent and then zero, the resultant induction is lower than the retentivity, i. e. the lower the retentivity, the more negative has been this field strength. This is indicated in Fig. 1 by the broken, so-called receding or working curves. If the maximum occurring negative field strength, the so-called limit field strength, corresponds to the point of intersection of one of the broken lines with the full line of Fig. 1, a substantially reversible ratio between the magnetic induction B and the field strength H inside the material is found in accordance with this broken line. In other words, the magnet will be stabilized for this application.

Consequently, with high negative field strengths, a permanent magnetic material having the magnetizing characteristic indicated by the full line curve may be used by demagnetizing the material, i. e., subjecting it to a negative field to such an extent that the receding curve b is obtained, since the effective coercive field strength H$_e$ is about half of the associated limit field strength H$_m$. However, since on the other hand the required volume of the permanent magnet material is proportional to the value BH$_{max}$. (in the embodiment shown in Fig. 1 this value for the curve b is lower by a factor 4 than for the curve a) a comparatively large volume of this material will be required.

In the device according to the invention, provision is made for the permanent magnet material to be operated along a more favorable receding curve or working line, for example, the curve c of Fig. 1 so that a smaller volume of this material is required to produce a given field strength in the core.

Figures 2, 4:
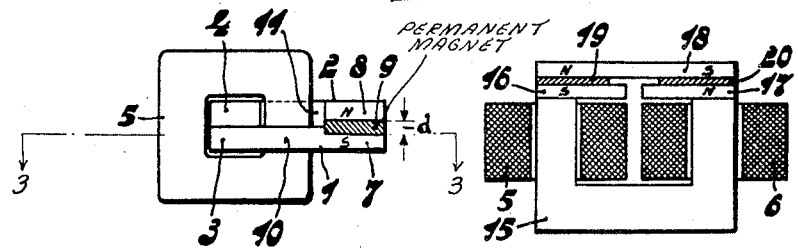
Fig. 2 is a plan view of one embodiment of a transformer according to the invention.
Fig. 4 is an elevational view of a second embodiment of a transformer according to the invention.
Figure 3:
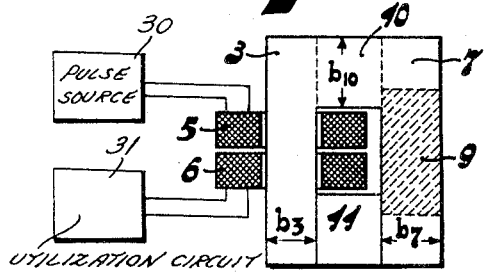
Fig. 3 is a sectional view along the line 3—3 in Fig. 2.

Fig. 2 is the plan view and Fig. 3 is a cross-sectional view of one embodiment of the invention. The ferromagnetic circuit comprises two U-shaped cores 1 and 2, the limb 3 of the core 1 engages the limb 4 of the core 2, and these limbs 3 and 4 are surrounded by windings 5 and 6. The winding 5, a primary winding, is fed by a source of voltage pulses 30 to be transformed to a higher value. The winding 6, a secondary winding, is coupled to a suitable utilization circuit 31 for the transformed voltage pulses, for example, a microwave tube circuit for radar. Between the limb 7 of the core 1 and the limb 8 of the core 2 is left an air-gap whose length is the spacing between the limbs 7 and 8, and in which is arranged a permanent magnet 9 magnetized in its direction of thickness NS of the kind described above. The transverse limbs 10 and 11 of the cores 1 and 2, respectively, are provided each on a different side of the windings 5 and 6 so that the cores 1 and 2 form a closed, ferromagnetic circuit with the exception of the air-gap between the limbs 7 and 8.

According to the invention, the permanent magnet 9 fills this air-gap only in part, as is shown by the cross-hatched portion of Fig. 3, leaving a shunting air-gap in parallel with the magnet. The invention is based on the discovery that, when the air-gap is completely filled, the receding curve $b$ is found, whereas by leaving out part of the ferromagnetic material a receding curve or working line $c$ is found.

If the permanent magnet 9 fills completely the air-gap, the working line $b$ is found, which implies that the value of the retentivity associated with the limit field strength $H_m$ corresponds to saturation flux in the core circuit 10—3—4—11. If a current through the windings 5 and/or 6 saturates this circuit 10—3—4—11, the magnetic potential between the limbs 7 and 8 is then equal to the product of the thickness $d$ of the magnet 9 and this limit field strength $H_m$.

However, if the magnet 9 exhibits the working line $c$, and if its surface is reduced corespondingly so that the air-gap is filled only in part by the magnet 9, the saturation flux across the circuit 10—3—4—11 flows only partly through this magnet, but the magnetic potential between the limbs 7 and 8 is not substantially varied as a consequence thereof. This is because the magnetic potential is equal to the product of the saturation flux across the circuit 10—3—4—11 and the reluctance of the gap, which reluctance is not substantially varied by the use of these permanent magnet materials, provided that the surface of the permanent magnet 9 is altered. That is, these magnet materials have a permeability of about one. On the other hand, however, the limit field strength and hence the said product diminishes only slightly if the working line $c$ is employed instead of the working line $b$; consequently, the thickness $d$ of the magnet 9 need be only a litle larger to obtain the same field strength. Thus, a considerably smaller quantity of permanent magnet material is sufficient in the invention.

In order to ensure that in the construction shown in Figs. 2 and 3 the sectional area of the ferromagnetic circuit 1—2 remains substanially the same at all areas, the width $b_{10}$ of the limbs 10 and 11 and $b_7$ of the limbs 7 and 8, respectively, is chosen to be correspondingly larger than the width $b_3$ of the limbs 3 and 4. If the thicknesses of the limbs 3, 4, 10 and 11 are equal, the width $b_{10}$ of the limbs 10 and 11 would have to be twice the width $b_3$ of the limbs 3 and 4. In certain cases, however, the width $b_{10}$ will be chosen slightly smaller in order that the limbs 10 and 11 are saturated slightly sooner than the further part of the ferromagnetic circuit.

Fig. 4 shows a further embodiment of the invention in which the ferromagnetic circuit, provided with the windings 5 and 6, comprises a U-shaped core 15, to the ends of which are secured two ferromagnetic plates 16 and 17 which form air-gaps between one another and a ferromagnetic plate 18 which completes the circuit. These air-gaps are filled in part by permanent magnets 19 and 20, the magnetizing directions N–S of which support one another. The surfaces of these magnets 19 and 20 are chosen to be such that substantially the working line $c$ is found.

Figure 5:
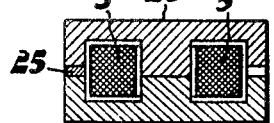
Fig. 5 is a cross-sectional view of a third embodiment of a transformer according to the invention.

Fig. 5 shows an alternative embodiment of the invention in which the winding 5 is provided with a so-called shell-shaped core comprising the rotation-symmetrical parts 23 and 24 which form between one another an annular air-gap on the periphery. This gap is filled only in part by one permanent magnet 25 or a plurality of permanent magnets 25 distributed along the periphery, the thickness and total surface of which are chosen to be such that substantially the working line $c$ is found for the material.

While we have described our invention in connection with specific embodiments and applications, other modifications thereof will be readily apparent to those skilled in this art without departing from the spirit and scope of the invention as defined in the appended claims.

What is claimed is:

1. An inductive system comprising a highly permeable ferromagnetic core, said core having an air-gap therein bounded by core surfaces having given cross-sectional dimensions and a given length dimension, a permanent magnet disposed in said air-gap and defining with said core a closed magnetic circuit, said permanent magnet being magnetized in the direction of length of the air-gap and having cross-sectional dimensions parallel to said core surfaces which are smaller than the dimensions of said surfaces thereby producing a shunting air-gap, said magnet consisting of an electrically non-conductive permanent magnetic material having a ratio of remanence to coercive field strength of less than 4, primary and secondary windings on said core, and means for applying an alternating current varying between two extremes to said primary winding, said magnet having a field intensity at which said core is substantially saturated in one direction at one extreme of said alternating current, said other extreme of said alternating current having a polarity at which a field is produced in said core opposing the field of the permanent magnet and having a magnitude at which said core is saturated in the opposite direction to said one direction, said shunting air-gap cooperating to prevent said opposing field from substantially demagnetizing said magnet.

2. An inductive system as claimed in claim 1, in which the system comprises a pair of U-shaped cores forming together a closed ferromagnetic circuit with an air-gap between two limbs of the U-shaped cores.

3. An inductive system as claimed in claim 1, in which the core comprises a U-shaped member and a closing plate disposed at the ends of the U and defining therewith a pair of air-gaps, a permanent magnet being disposed only partly in each of said gaps.

4. An inductive system as claimed in claim 1, in which the circuit comprises a shell-shaped core having an annular air-gap.

References Cited in the file of this patent

UNITED STATES PATENTS

| | | |
|---|---|---|
| 2,339,406 | Holden | Jan. 18, 1944 |
| 2,381,763 | McCreary | Aug. 7, 1945 |
| 2,615,155 | Ogle | Oct. 21, 1952 |